United States Patent
Hefner et al.

(10) Patent No.: US 10,659,595 B2
(45) Date of Patent: May 19, 2020

(54) DETERMINING ORIENTATION OF A MOBILE DEVICE

(71) Applicant: MOTOROLA MOBILITY LLC, Chicago, IL (US)

(72) Inventors: Eric J. Hefner, Lombard, IL (US); John S. Ratke, Chicago, IL (US); Jenna M. Zylema, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/167,427

(22) Filed: Oct. 22, 2018

(65) Prior Publication Data
US 2020/0128123 A1    Apr. 23, 2020

(51) Int. Cl.
*H04M 1/725*   (2006.01)
*G06K 9/00*    (2006.01)

(52) U.S. Cl.
CPC .... *H04M 1/72569* (2013.01); *G06K 9/00255* (2013.01); *H04M 2250/12* (2013.01); *H04M 2250/52* (2013.01)

(58) Field of Classification Search
CPC ......... H04M 1/72569; H04M 2250/52; H04M 2250/12; G06K 9/00255
See application file for complete search history.

(56) References Cited

U.S. PATENT DOCUMENTS

| 10,028,227 B2 * | 7/2018 | Kim ................ G06F 1/1694 |
| 2016/0018872 A1 * | 1/2016 | Tu ................ G06F 1/3234 345/173 |
| 2017/0366943 A1 * | 12/2017 | Yoon ................ H04W 4/025 |

OTHER PUBLICATIONS https://www.iphonetricks.org/apple-watch-activate-on-wrist-raise-setting/, posted in How To by Tyrone, Jun. 3, 2015.

* cited by examiner

*Primary Examiner* — Marcos L Torres
(74) *Attorney, Agent, or Firm* — Yudell Isidore PLLC

(57) ABSTRACT

A method, a mobile device, and a computer program product for determining orientation of a mobile device. The method includes detecting, via an accelerometer, movement of a mobile device and calculating, by a processor, an orientation of the mobile device based on accelerometer data received from the accelerometer as the mobile device is moving. The method further includes tracking the orientation of the mobile device as the mobile device moves over a period of time and maintaining an image capture device and a display in an off state, while the mobile device is moving. The method further includes determining if the mobile device is in a landing position, based, at least partially, on the calculated orientation of the mobile device and in response to determining that the mobile device is not in the landing position, continuing to maintain the image capturing device in the off state such that power consumption of the mobile device is reduced.

17 Claims, 13 Drawing Sheets

DETERMINING ORIENTATION OF A MOBILE DEVICE

BACKGROUND

1. Technical Field

The present disclosure generally relates to electronic devices and in particular to reducing power consumption of a mobile device while not in use.

2. Description of the Related Art

Modern personal devices, such as cell phones, operate with a limited energy supply, such as a battery. Many cell phones use sensors to sense movement and rotation. Unfortunately, the operation of the sensors can cause the cell phone to turn on and consume power during periods of time when the cell phone is not in use. For example, if the cell phone is in a pocket of a user and not in use, the sensors can sense movement and turn on a display, which consumes more power, even though the cell phone is not in use.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
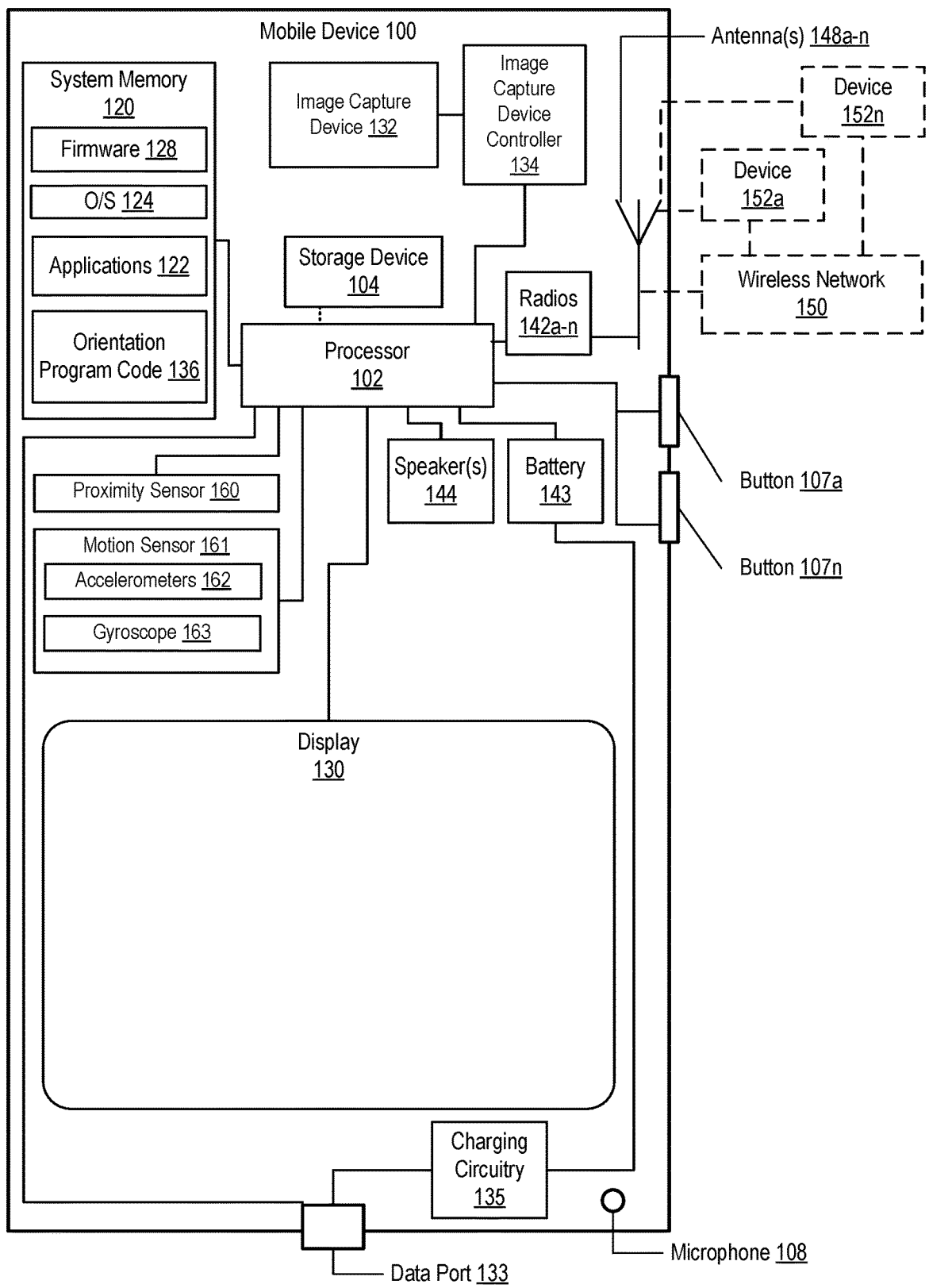
FIG. 1 depicts an example mobile device within which various aspects of the disclosure can be implemented, according to one or more embodiments.

The illustrative embodiments provide a method, a mobile device, and a computer program product for determining orientation of a mobile device. The method comprises detecting, via an accelerometer within a mobile device, movement of the mobile device, and calculating, by a processor, an orientation of the mobile device based on accelerometer data received from the accelerometer as the mobile device is moving. The method further includes tracking the orientation of the mobile device as the mobile device moves over a period of time and maintaining a display and an image capture device in an off state, while the mobile device is moving. The method further includes determining if the mobile device is in a landing position, based, at least partially, on the calculated orientation of the mobile device, and in response to determining that the mobile device is not in the landing position, continuing to maintain the image capture device in the off state such that power consumption of the mobile device is reduced.

According to another embodiment, a mobile device comprises a memory having stored thereon an orientation program code for determining an orientation of the mobile device. The mobile device further includes an accelerometer that detects movement of the mobile device and one or more processors that are communicatively coupled to the memory and to the accelerometer. The processor receives accelerometer data from the accelerometer as the mobile device is moving. The orientation program code enables the mobile device to calculate, by the processor, an orientation of the mobile device, based on the accelerometer data. The orientation program code further enables the mobile device to track the orientation of the mobile device as the mobile device moves over a period of time, and to maintain a display and an image capture device in an off state, while the mobile device is moving. The orientation program code further enables the mobile device to determine if the mobile device is in a landing position based, at least partially, on the calculated orientation of the mobile device. In response to determining that the mobile device is not in the landing position, the orientation program code further continues to maintain the image capture device in the off state such that power consumption of the mobile device is reduced.

According to an additional embodiment, a computer program product includes a computer readable storage device with program code stored thereon which, when executed by one or more processors of a mobile device having an accelerometer and a memory, enables the mobile device to complete the functionality of receiving accelerometer data from the accelerometer as the mobile device is moving and to calculate an orientation of the mobile device based on the accelerometer data. The computer program product further enables the mobile device to track the orientation of the mobile device as the mobile device moves over a period of time and to maintain a display and an image capture device in an off state, while the mobile device is moving. The computer program product further enables the mobile device to determine if the mobile device is in a landing position based at least partially on the calculated orientation of the mobile device and in response to determining that the mobile device is not in the landing position, continue to maintain the image capture device in the off-state such that power consumption of the mobile device is reduced.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example mobile device 100 within which various aspects of the disclosure can be implemented, according to one or more embodiments. Examples of such mobile devices include, but are not limited to, a notebook computer, a mobile phone, a digital camera and a tablet computer, etc. Mobile device 100 includes processor 102, which is communicatively coupled to storage device 104, system memory 120, display 130 and image capture device controller 134.

System memory 120 may be a combination of volatile and non-volatile memory, such as random access memory (RAM) and read-only memory (ROM). System memory 120 can store program code or similar data associated with firmware 128, an operating system 124, applications 122, and orientation module containing orientation program code 136. Although depicted as being separate from the applications 122, orientation program code 136 may also be implemented as an application. Processor 102 loads and executes program code stored in system memory 120. Examples of program code that may be loaded and executed by processor 102 include program code associated with applications 122 and program code associated with orientation program code 136.

In one embodiment, image capture device 132 is communicatively coupled to image capture device controller 134, which is communicatively coupled to processor 102. Image capture device 132 can capture images that are within the field of view of image capture device 132.

Mobile device 100 can further include data port 133 coupled with the processor 102, charging circuitry 135, and battery 143. In one embodiment, display 130 can be a touch screen device that can receive user input. Mobile device 100 further includes a microphone 108, one or more speakers 144, and one or more buttons 107a-n. Buttons 107a-n may provide controls for volume, power, and a camera. Mobile device 100 further includes radios 142a-n, which are coupled to antennas 148a-n. In this example, radios 142a-n and antennas 148*a-n* allow mobile device 100 to communicate wirelessly with devices 152*a-n* via wireless network 150.

Mobile device 100 further includes proximity sensor 160 and motion sensor(s) 161. Motion sensor(s) 161 can include one or more accelerometers 162 and gyroscope 163. Proximity sensor 160 can be an infrared (IR) sensor that detects the presence of a nearby object. Motion sensor(s) 161 can detect movement of mobile device 100 and provide motion data to processor 102 that indicate the spatial orientation and movement of mobile device 100. Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100. Gyroscopes can typically consume several times more power than do accelerometers. Minimizing the operation of a gyroscope is beneficial for a battery powered device such as mobile device 100.

Accelerometers 162 measure the difference between linear acceleration in the accelerometer's reference frame and the earth's gravitational field vector. In one embodiment, accelerometers 162 can be piezoelectric devices or micro electro-mechanical systems (MEMS) that convert mechanical motion into an electrical signal. This electrical signal can be processed to determine orientation. In the absence of linear acceleration, the accelerometer output is a measurement of the rotated gravitational field vector. Multiple accelerometers can be used to determine orientation of a device in yaw, pitch and roll orientation angles. Accelerometers 162 provide vector data for each axis that includes a magnitude of acceleration and the direction of the acceleration. In one embodiment, the magnitude output from accelerometers 162 can be in units of meters per second squared. Vector algebra can be used to calculate corresponding orientation angles in yaw, pitch and roll of mobile device 100 based on the accelerometer data. For example, the pitch angle, θ, can be calculated using the following formula:

$$\tan \theta = -Gpx \div \sqrt{(Gpy^2 + Gpz^2)}$$

Where Gpx, Gpy and Gpz are normalized accelerometer values in each axis. The roll angle, φ, can be calculated using the following formula:

$$\tan \phi = Gpy \div \text{sign}(Gpz)\sqrt{(Gpy^2 + Gpz^2)}$$

Where Gpx, Gpy and Gpz are normalized accelerometer values in each axis. Sign (Gpz) has a value +1 if Gpz is non-negative and −1 if Gpz is negative. This term, sign (Gpz) is present to recover a negative sign (if Gpz has a negative value) after squaring.

Figure 2:
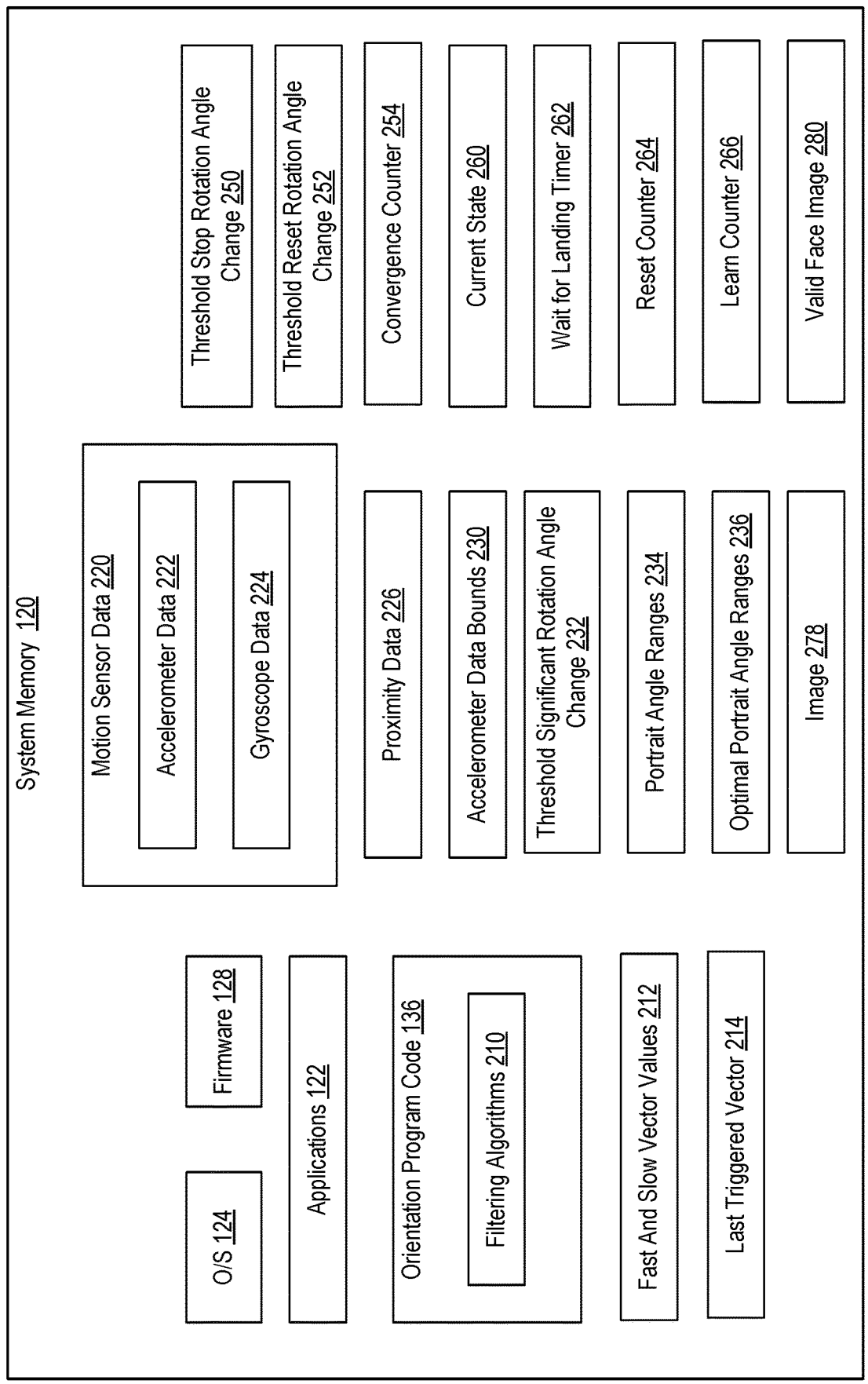
FIG. 2 is a block diagram of example contents of the system memory of a mobile device, according to one or more embodiments.

In the description of each of the following figures, reference is also made to specific components illustrated within the preceding figure(s). With reference now to FIG. 2, one embodiment of example contents of system memory 120 of mobile device 100 is shown. System memory 120 includes data, software, and/or firmware modules, including firmware 128, operating system 124, applications 122, and orientation program code 136. Orientation program code 136 enables calculation of an orientation of mobile device 100 and determines if mobile device is in a non-rotating position that is viewable by a user (the landing position). In one embodiment, orientation program code 136 performs the processes presented in the flowcharts of FIGS. 4 through 11, as will be described below. Orientation program code 136 includes filtering algorithms 210 and fast and slow vector values 212. Filtering algorithms 210 are slow and fast filters used for filtering acceleration data received from accelerometer 162. Fast and slow vector values 212 include a magnitude and direction of movement for each axis.

System memory 120 further includes motion sensor data 220, proximity data 226, and accelerometer data bounds 230. Motion sensor data 220 includes accelerometer data 222 received from accelerometers 162 and gyroscope data 224 received from gyroscope 163. Accelerometer data 222 contains linear acceleration values in multiple axes (X, Y and Z) for a period of time. Gyroscope data 224 contains rotation or angular rotational velocity values for a period of time. Proximity data 226 is received from proximity sensor 160 and indicates the presence of a nearby object. Accelerometer data bounds 230 are high accelerometer values for mobile device 100 that are ignored during calculation of the orientation of mobile device 100.

System memory 120 further includes threshold significant rotation angle change 232, portrait angle ranges 234, optimal portrait vector or angle ranges 236, threshold stop rotation angle change 250, threshold reset rotation angle change 252, and convergence counter 254. Threshold significant rotation angle change 232 is a minimum rotation angle change that, when exceeded, indicates that mobile device 100 is rotating. Portrait angle ranges 234 are pitch and roll angle value ranges that define mobile device 100 as being oriented in a portrait state. Optimal portrait vector or angle ranges 236 are a dynamic subset of portrait angle ranges 234 that are determined over a period of time after mobile device 100 is in the landing position.

Threshold stop rotation angle change 250 is an angular change in rotation that indicates the mobile device has stopped rotating. Threshold reset rotation angle change 252 is the minimum angular change in rotation from the landing position to restart or reset the process of determining if the mobile device is in the landing position. Convergence counter 254 is used in determining if mobile device 100 has ceased rotating. Convergence counter 254 is incremented or decremented based on the amount of rotation of mobile device 100, as will be explained further in FIG. 6.

System memory 120 also includes current state 260, wait for landing timer 262, reset counter 264, learn counter 266, image 278, and valid face image 280. Current state 260 is a current setting of an orientation state of mobile device 100. For example, mobile device 100 can have a current state of a wait for tilt state, a wait for landing state, a landing position state, and a reset state. Wait for landing timer 262 tracks a time period after mobile device 100 has started rotating until mobile device 100 is oriented in a landing position. Wait for landing timer 262 is used to restart the process of determining if the mobile device is rotating, when the wait for landing timer 262 has been exceeded.

Reset counter 264 tracks a number of intervals that mobile device 100 has been in a landing position. Reset counter 264 has a minimum value of zero. Learn counter 266 tracks the number of portrait angles or triggered vectors that have been averaged to obtain optimal portrait angles ranges 236. Image 278 is an image taken or captured by image capture device 132. Valid face image 280 is a stored authenticated image of the face of the user of mobile device 100.

Figure 3B:
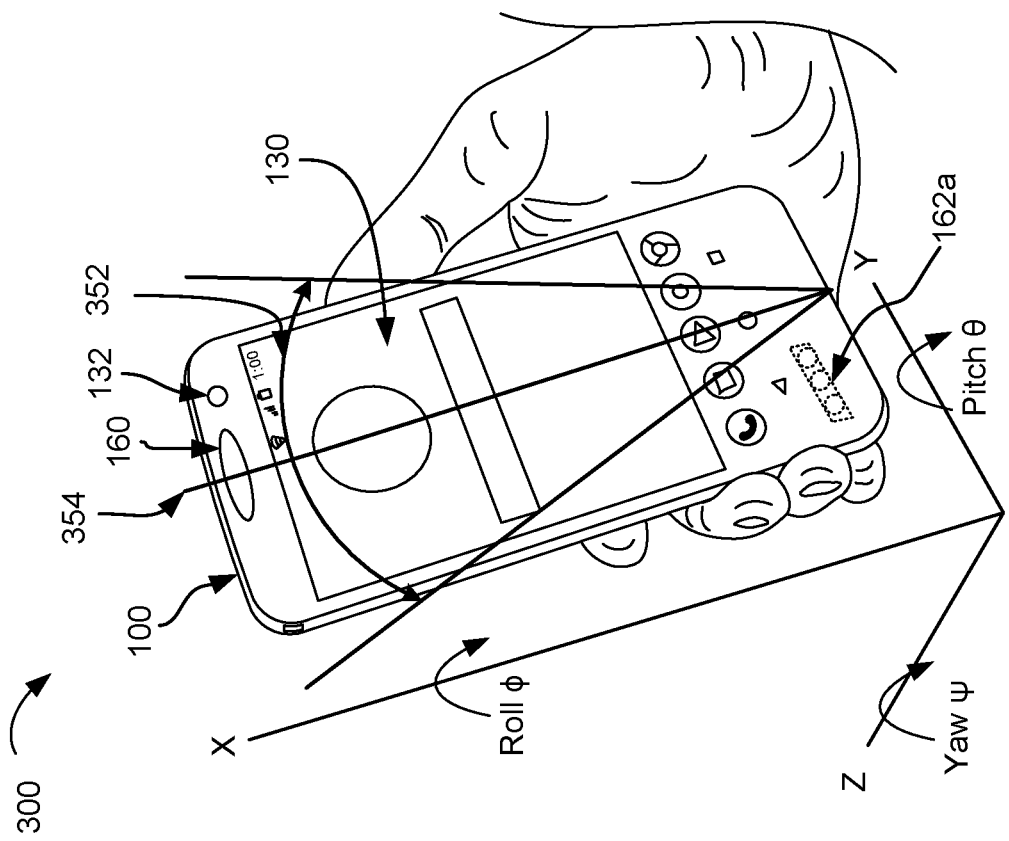
FIG. 3B is an example illustration of a mobile device orientation in a landing position, according to one or more embodiments.
Figure 3A:
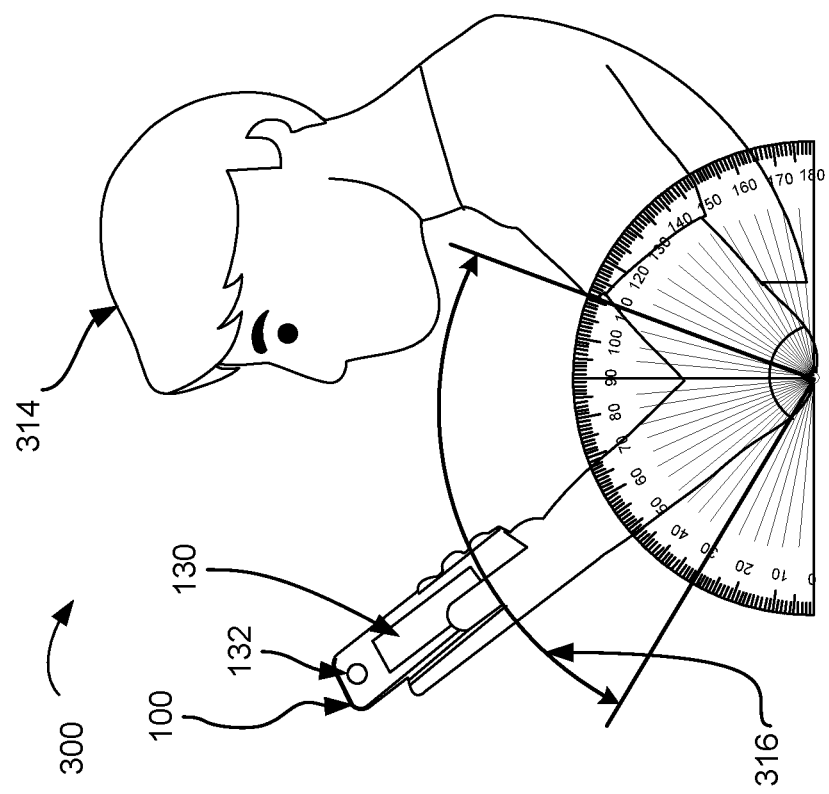
FIG. 3A is an example illustration of a mobile device pitch in a landing position, according to one or more embodiments.

FIG. 3A illustrates an example of mobile device 100 in a landing position 300. In landing position 300, mobile device 100 is positioned with display 130 facing upwards for viewing by a user 314. In landing position 300, mobile device 100 is oriented with a pitch angle 316 having a range between 30 and 110 degrees from a horizontal plane. Pitch angle 316 can also be referred to as a tilt angle. Image capture device 132 faces the same direction as display 130 such that image capture device 132 faces the front of mobile device 100. In landing position 300, image capture device 132 is positioned to capture an image (e.g., a self portrait or "selfie") of user 314.

FIG. 3B illustrates further details of mobile device 100 in landing position 300. Mobile device 100 can rotate about three axes X, Y and Z. Rotation about an X axis can be referred to as roll ($\varphi$). The X axis is aligned along the body axis or length of mobile device 100. Rotation about a Y axis can be referred to as pitch ($\theta$). The Y axis is aligned at right angles to both the X and Z axes so that the three axes form a right-handed coordinate system. Rotation about a Z axis can be referred to as yaw ($\psi$). The Z axis points downwards so that the Z axis is aligned with the force of gravity from the earth when mobile device 100 is lying flat. Changes in orientation are described by rotations in roll $\varphi$, pitch $\theta$ and yaw $\psi$ about the X, Y and Z axes. In one embodiment, the rotation of mobile device 100 in either one or both of pitch and roll can be referred to as tilt. Tilt can represent the combination of pitch and/or roll movements.

In landing position 300, mobile device 100 is positioned with display 130 facing towards a user for viewing. Also, in landing position 300, mobile device 100 has an orientation angle (i.e., the angle between the X-Y projection of the up vector onto the +X axis) within the range of −25 and +25 degrees from vertical. In an embodiment, the position of mobile device 100 can be described using either pitch and roll values or tilt and orientation angle values. Pitch and roll values can be used to calculate tilt and orientation angle values and vice versa. The terms pitch and roll can be used interchangeably with tilt and orientation angle to define the orientation of mobile device 100. Further, in landing position 300, proximity sensor 160 provides proximity data that indicates that the proximity sensor is uncovered (i.e., no objects are near proximity sensor 160). Proximity sensor 160 can be covered when mobile device 100 is in a pocket of a user or is lying face down.

Figure 3C:
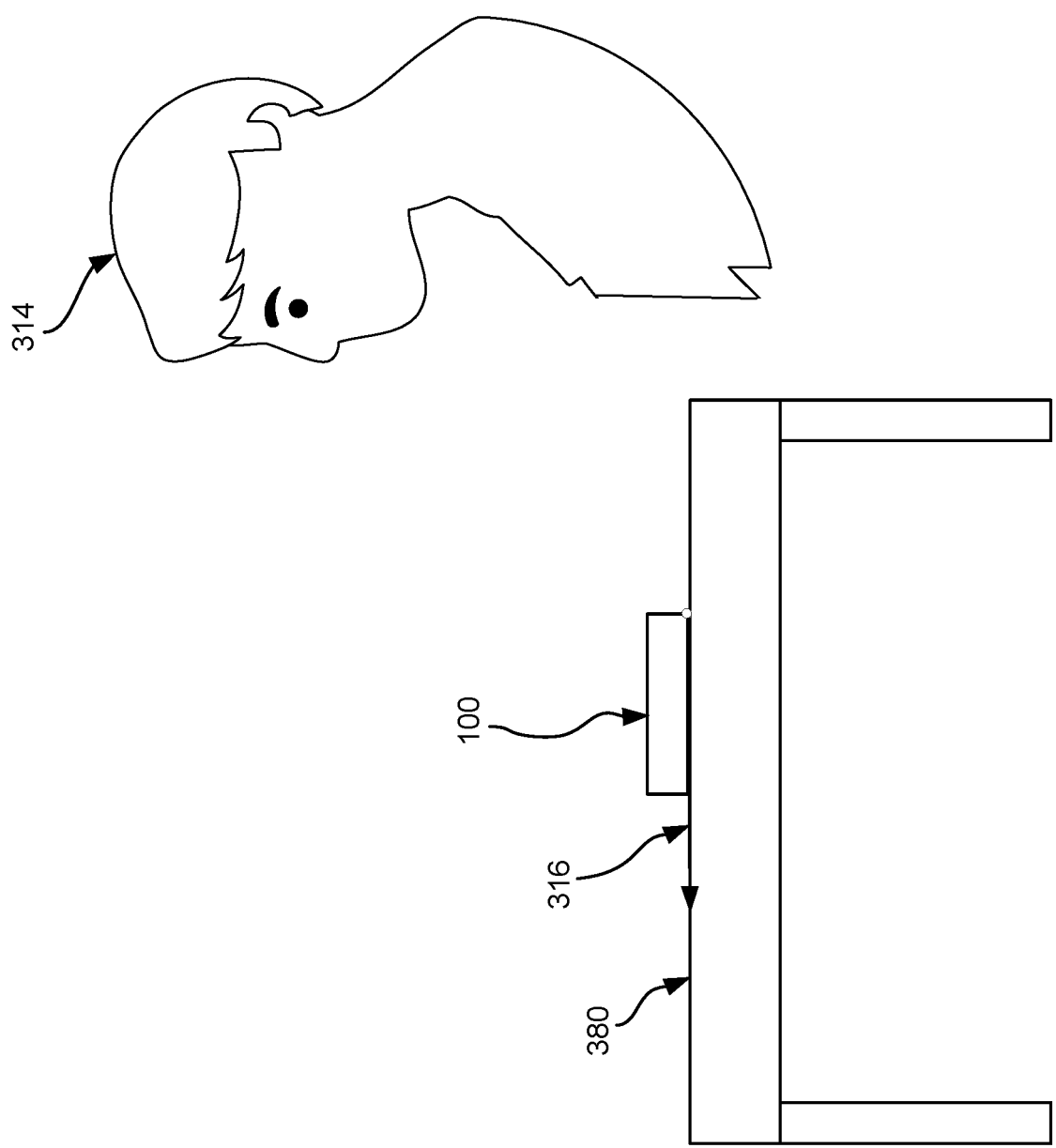
FIG. 3C is an example illustration of a mobile device that is not in a landing position, according to one or more embodiments.

FIG. 3C illustrates an example of mobile device 100 not being in a landing position. Mobile device 100 is positioned lying on a table 380. In FIG. 3C, mobile device 100 is oriented with a pitch angle 316 of zero degrees from a horizontal plane. The pitch angle of zero degrees is outside of the pitch angle range for the landing position. In one embodiment, a user can select an orientation angle range that can be used to determine when mobile device 100 is in a landing position.

In one embodiment, processor 102, executing orientation program code 136, can detect, via accelerometers 162, movement of mobile device 100. Processor 102 also receives accelerometer data 222 from accelerometers 162, as mobile device 100 is moved. Processor 102 calculates an orientation of mobile device 100 based on accelerometer data 222 and tracks the orientation of mobile device 100 as the mobile device is moved over a period of time. Processor 102 maintains image capture device 132 and display 100 in an off state, while mobile device 100 is moving, provided that image capture device 132 is not in use. Processor 102 also maintains display 130 in an off state, while mobile device 100 is moving, provided that display 130 is not being used. Processor 102 determines if mobile device 100 is in landing position 300 based at least partially on the calculated orientation of mobile device 100. In response to determining that mobile device 100 is in landing position 300, processor 102 triggers image capture device 132 to turn on and autonomously detect or capture image 278 via image capture device 132. The detected/captured image 278 can then be compared to valid face image 280. If the detected/captured image 278 is determined to match the valid face image 280, mobile device 100 can be unlocked for access and display 130 is activated.

Image capture device 132 and display 100 can be kept in an off state when the orientation of mobile device 100 is not in an orientation where the display screen can be viewed by a user (i.e., not in landing position 300). Keeping image capture device 132 and display 100 in the off state results in lower battery power consumption over conventional applications where the image capture device and display automatically turn on based on detected movement. Image capture device 132 is turned on and triggered to capture image 278 when the orientation of mobile device 100 is determined to be in an orientation at which the mobile device screen can be viewed by a user (i.e., landing position 300). If the image capture device 132 or display 100 have been activated by a user or are in use, processor 102, would continue to track the orientation of mobile device 100 during movement; however, processor 102, would not turn off any functions of mobile device 100 that are currently in use.

According to one aspect, the present disclosure increases battery life of mobile device 100 by using only data from accelerometers 162 to calculate the orientation of mobile device 100. That is, no gyroscope data is used. In one or more embodiments, accelerometers consume less power than gyroscopes. While accelerometers 162 are providing accelerometer data to processor 102 to calculate the orientation of mobile device 100, gyroscope 163 can be turned off, saving battery power and increasing the life of battery 143. Further, because image capture device 132 is only activated after determining that mobile device 100 is in the landing position 300, battery life of mobile device 100 is increased by minimizing false activations of image capture device 132 when mobile device 100 is not in an orientation to be viewed by a user. In addition, because image capture device 132 is only activated after determining that mobile device 100 is in the landing position 300, false activations of image capture device 132 due to incidental movement of mobile device 100 such as shaking, fidgeting, in vehicle motion, vibrations, and walking motions are minimized. Image capture device 132 is only activated after determining that mobile device 100 is in the landing position 300, therefore false activations of image capture device 132 when mobile device 100 is in an un-viewable state such as in a pocket, a bag or face down are minimized.

FIGS. 4-11 depict various methods 400, 500, 600, 700, 800, 900, 1000 and 1100 (collectively methods 400-1100) for determining orientation of a mobile device, according to one or more embodiments. The description of methods 400-1100 will be described with reference to the components and examples of FIGS. 1-3C. The operations depicted in FIGS. 4-11 can be performed by mobile device 100 or any suitable device, including one or more components of mobile device 100. For example, one or more of the processes of the methods described in FIGS. 4-11 may be performed by a processor (e.g., processor 102) executing program code associated with orientation program code 136. In one embodiment, methods 400-1100 assume that mobile device 100 is initially in a sleep mode or low power mode where power consumption is reduced and mobile device 100 is not actively being used by a user.

Method 400 begins at the start block 402. At block 404, processor 102 sets a current state 260 of the mobile device to a wait for rotation state. Processor 102 receives accelerometer data 222 from the accelerometers 162 (block 406). Accelerometer data 222 contains acceleration values for each of the X, Y and Z axes. At decision block 408, processor 102 determines if the accelerometer data 222 is within accelerometer data bounds 230. In response to determining that the accelerometer data 222 is not in accelerometer data bounds 230, processor 102 returns to block 406 to continue receiving accelerometer data 222 from accelerometers 162. When accelerometer data 222 is not within accelerometer data bounds 230, this corresponds to a high acceleration that significantly deviates from nominal gravity acceleration and the acceleration data for this interval is discarded. In response to determining that the accelerometer data 222 is in accelerometer data bounds 230, processor 102 calculates fast and slow filter vector values 212 that are used by filtering algorithms 210 to determine if mobile device 100 is rotating and/or has stopped rotating (block 410). The fast and slow vector values 212 include a magnitude and direction of movement for each axis. After block 410 of FIG. 4, the method continues to block 502 of FIG. 5.

Figure 5:
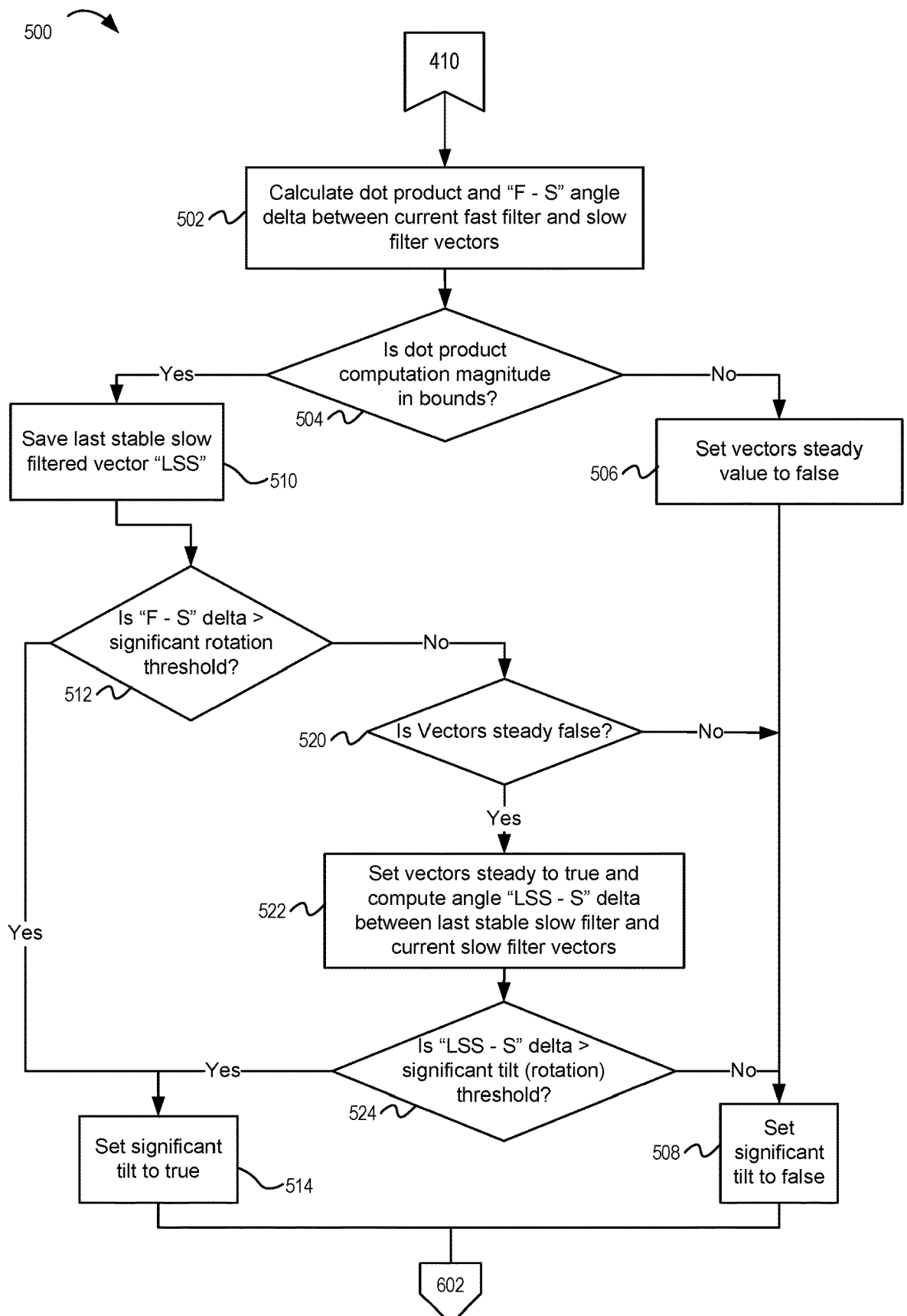
FIG. 5 depicts a method of determining if a mobile device has been tilted, according to one or more embodiments.

FIG. 5 illustrates a method 500 for determining if mobile device 100 has been rotated. Processor 102 calculates a dot product and the angle change or delta between the fast and slow filter vector values 212 (block 502). The angle change or delta indicates that mobile device 100 is rotating. The dot product is an algebraic operation that takes the vector values and returns a single number. In one embodiment, the acceleration data can be sampled at a rate of 25 Hertz, allowing the current fast to last fast filter vector updates to occur every 40 milliseconds. Processor 102 determines if the dot product is within a pre-determined range of values (decision block 504). In one embodiment, filtering algorithms 210 discard the accelerometer data and pause on high acceleration that significantly deviates from the nominal gravity vector of 9.8 meters per second squared. In response to determining that the dot product is not within the pre-determined range of values, processor 102 sets a vectors steady value to false (block 506) and sets a significant rotation or tilt value to false (block 508). A significant tilt value of false indicates that mobile device 100 is not undergoing rotation that could be large enough to move to a landing position. The rotation of mobile device 100 in either one or both of pitch and roll can be referred to as tilt. Tilt can represent the combination of pitch and/or roll movements.

In response to determining that the dot product is within the pre-determined range of values, processor 102 saves the last stable slow (LSS) vector value to fast and slow filter vector values 212 (block 510). Processor 102 determines if the difference or delta between the fast and slow filter vector values is greater than the threshold significant rotation angle change 232 (decision block 512). In one embodiment, the threshold significant rotation angle change 232 can be between 15 and 25 degrees. In response to determining that the difference or delta between the fast and slow filter vector values is greater than the threshold significant rotation angle change 232, processor 102 sets a significant tilt value to true (block 514). A significant tilt value of true indicates that mobile device 100 is undergoing rotation that could be large enough to move to a landing position. In response to determining that the difference or delta between the fast and slow filter vector values is not greater than the threshold significant rotation angle change 232, processor 102 determines if the vectors steady value is false (decision block 520). The vectors steady value is used to recover from data loss due to high acceleration noise. The slow filtered vectors from before and after the acceleration event are compared to detect a significant change in pitch and/or roll (tilt) that may have occurring during the data loss.

In response to determining that the vectors steady value is not false, processor 102 sets a significant tilt value to false (block 508). In response to determining that the vectors steady value is false, processor 102 sets a significant tilt value to true and calculates the angle change or delta between the LSS vector values and the current slow vector values (LSS−S) (block 522). Processor 102 determines if the angle change or delta between the LSS vector values and the current slow vector values are greater than threshold significant rotation angle change 232 (decision block 524). In response to determining that the angle change or delta between the LSS vector values and the current slow vector values are greater than threshold significant rotation angle change 232, processor 102 sets a significant tilt value to false (block 508). In response to determining that the angle change or delta between the LSS vector values and the current slow vector values are not greater than threshold significant rotation angle change 232, processor 102 sets a significant tilt value to false (block 514). After blocks 508 and 514, processor 102 continues to block 602 of FIG. 6.

Figure 6:
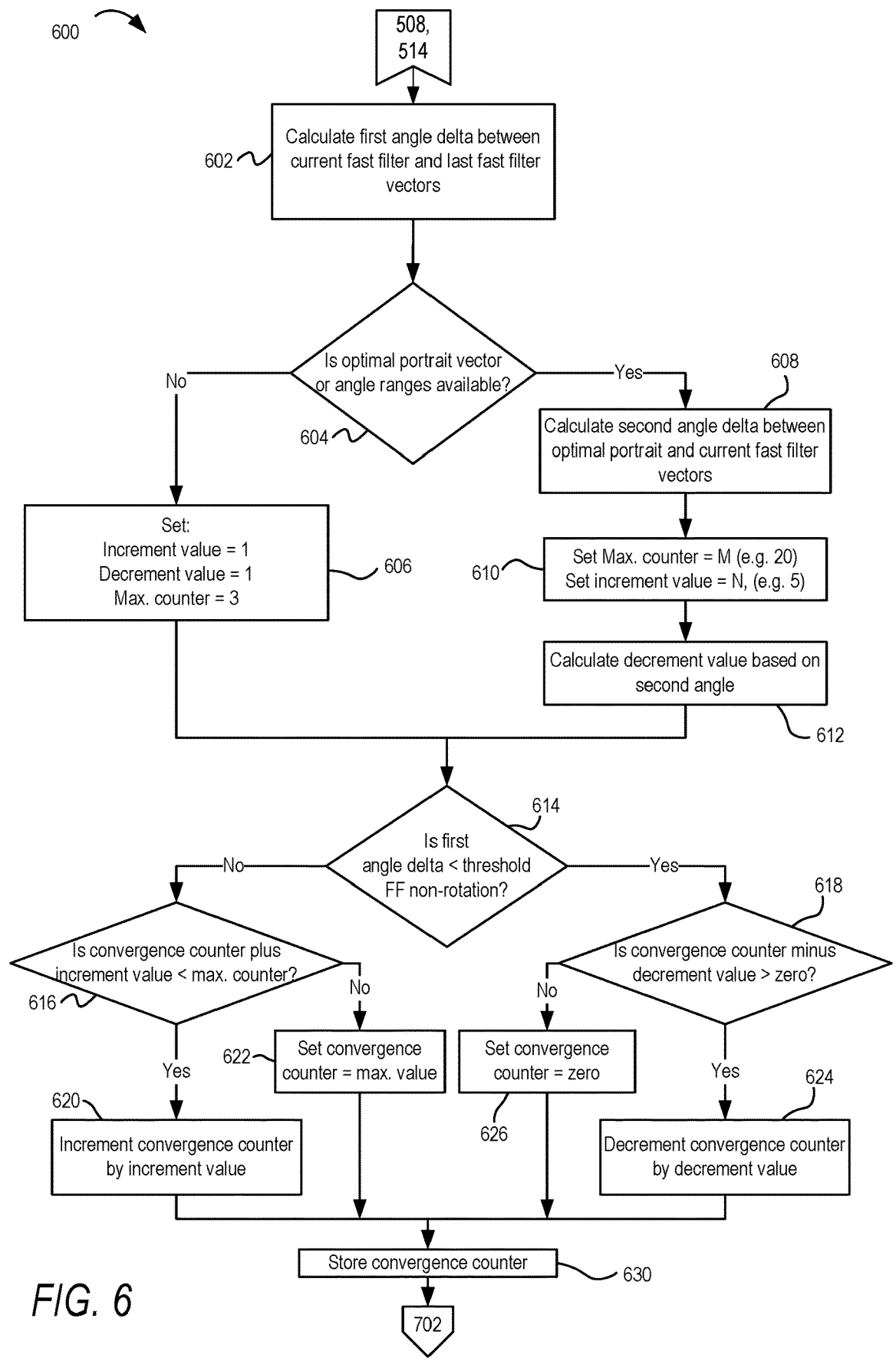
FIG. 6 depicts a method of determining if a mobile device has stopped rotating, according to one or more embodiments.

Turning to FIG. 6, there is shown method 600 for using a convergence counter to determine if mobile device 100 is stopping rotation. At block 602, processor 102 calculates a first angle change or delta between the last stable fast (LSF) vector values and the current fast vector values. In one embodiment, the acceleration data can be sampled at a rate of 25 Hertz, allowing the current fast to last fast filter vector updates to occur every 40 milliseconds. A low angle change or delta value indicates that mobile device 100 has ceased rotation.

Processor 102 determines if optimal portrait vector or angle ranges 236 are available for use (decision block 604). Optimal portrait vector or angle ranges 236 are a dynamic subset of portrait angle ranges 234 that are determined over a period of time after mobile device 100 has been determined to be in landing position 300. In one embodiment, optimal portrait vector or angle ranges 236 can be available after mobile device 100 has completed a pre-determined number of instances of being oriented in landing position 300. For example, the pre-determined number of instances can be ten. The determination of optimal portrait vector or angle ranges 236 will be detailed in the description of FIG. 11.

In response to the optimal portrait vector or angle ranges 236 not being available, processor 102 sets an increment value for convergence counter 254 equal to one, sets a decrement value for convergence counter 254 equal to one, and sets a maximum value for convergence counter 254 equal to three (block 606). In response to the optimal portrait vector or angle ranges 236 being available, processor 102 calculates a second angle change or delta between the optimal portrait vector or angle ranges 236 and the current fast vector values (block 608).

Processor 102 sets the maximum value for convergence counter 254 equal to a pre-determined variable M and sets an increment value for convergence counter 254 equal to a pre-determined variable N (block 610). In one embodiment, M can have a value of twenty and N can have a value of five. Processor 102 calculates a decrement value for convergence counter 254 based on a power of the inverse of the second calculated angle change or delta from block 608 (block 612). The convergence counter 254 is dynamically decremented based on the calculated second angle delta between the optimal portrait vector and the current fast filtered vector. Smaller angles correspond to faster decrementing and convergence. Larger angles result in slower convergence and reduced false positive triggers that mobile device 100 has stopped rotating.

Processor 102 determines if the calculated first angle change or delta is less than threshold fast filter non-rotation or stop angle change 250 (decision block 614). A small calculated angle change or delta indicates that mobile device 100 has stopped rotating. In one embodiment, threshold fast filter non-rotation or stop angle change 250 can be 4 degrees. Processor 102 uses the first calculated angle change or delta in decision block 614 if the optimal portrait vector or angle ranges 236 are available (i.e., yes from decision block 604). Processor 102 uses the second calculated angle change or delta in decision block 614 if the optimal portrait vector or angle ranges 236 are not available (i.e., no from decision block 604).

In response to determining that the calculated angle change or delta is not less than threshold fast filter non-rotation or stop angle change 250, processor 102 determines if the current value of convergence counter 254 plus the increment value is less than the maximum convergence counter value (decision block 616). In response to determining that the current value of convergence counter 254 plus the increment value is less than the maximum convergence counter value, processor 102 increments the value of convergence counter 254 by the increment value (block 620) and stores the value of convergence counter 254 to system memory 120 (block 630). In response to determining that the current value of convergence counter 254 plus the increment value is not less than the maximum convergence counter value, processor 102 sets the value of convergence counter 254 equal to the maximum convergence counter value (block 622) and stores the value of convergence counter 254 to system memory 120 (block 630).

In response to determining that the calculated angle change or delta is less than threshold fast filter non-rotation or stop angle change 250, processor 102 determines if the current value of convergence counter 254 minus the decrement value is greater than zero (decision block 618). In response to determining that the current value of convergence counter 254 minus the decrement value is greater than zero, processor 102 decrements the value of convergence counter 254 by the decrement value (block 624) and stores the value of convergence counter 254 to system memory 120 (block 630). In response to determining that the current value of convergence counter 254 minus the decrement value is not greater than zero, processor 102 sets the value of convergence counter 254 equal to zero (block 626) and stores the value of convergence counter 254 to system memory 120 (block 630). After block 630, processor 102 continues with block 702 of FIG. 7A.

Figure 7A:
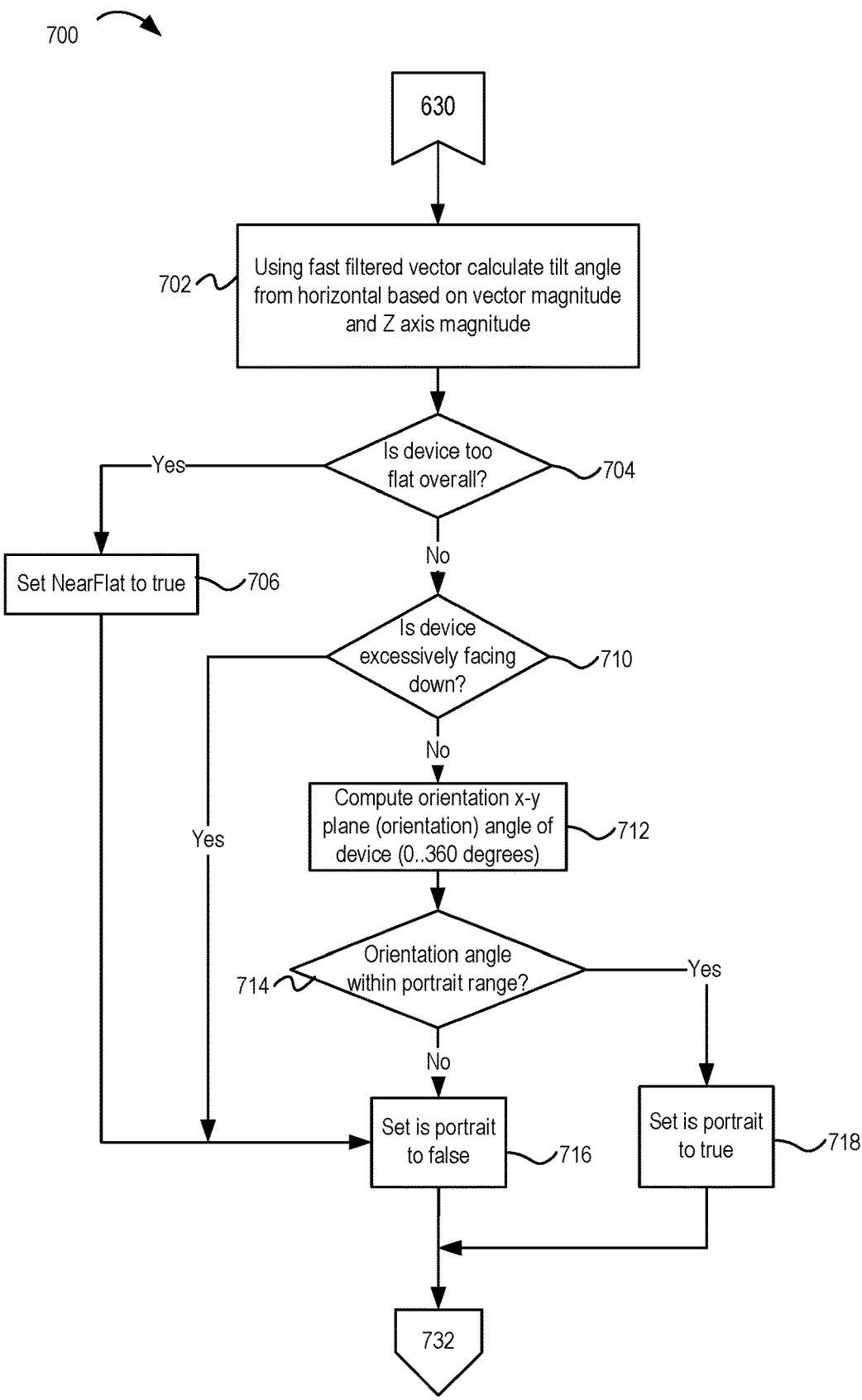
FIGS. 7A and 7B depict a method of calculating orientation of a mobile device, according to one or more embodiments.

Referring to FIG. 7A, there is shown a method 700 for calculating orientation of a mobile device. At block 702, processor 102 calculates a Y-Z plane angle or pitch angle of mobile device 100 from a horizontal axis based on the fast filtered vector magnitude and Z axis magnitude. Processor 102 determines if the calculated pitch angle of mobile device 100 is within portrait angle range 234. Processor 102 determines if the calculated pitch and roll angles (i.e., tilt) are too flat (i.e., the calculated pitch and roll angles are both below or less than the lower end of the pre-determined pitch and roll angle range of portrait angle range 234) (decision block 704). In one embodiment, the lower end of the pre-determined pitch and roll angles (i.e., near flat angles) used in decision block 704 can be 21 degrees from horizontal. In an embodiment, mobile device 100 can be determined to be too flat when the z-axis is aligned within n degrees of the gravity vector, where n degrees is a pre-determined angular value. In response to determining that the tilt of mobile device 100 is too flat, processor 102 sets a near flat value to true (block 706) and sets a portrait value to false (block 716). In response to determining that the tilt of mobile device 100 is not too flat, processor 102 determines if mobile device 100 is excessively facing downward (i.e., the calculated pitch and/or roll angles are greater than the upper end of the pre-determined tilt angle range of portrait angle range 234) (decision block 710). In one embodiment, the pre-determined angle used in decision block 710 can be 110 degrees from horizontal.

In response to determining that mobile device 100 is excessively facing downward, processor 102 sets a portrait value to false (block 716). In response to determining that mobile device 100 is not excessively facing downward, processor 102 calculates an X-Y plane angle or orientation angle value between 0 and 360 degrees for mobile device 100 (block 712). Processor 102 determines if the calculated orientation angle value is within the portrait angle range 234 (decision block 714). In one embodiment, the portrait orientation angle range 234 can be +/−25 degrees from zero or vertical. In response to determining that the calculated orientation angle value is not within the portrait angle range 234, processor 102 sets a portrait value to false (block 716). In response to determining that the calculated orientation angle value is within the portrait angle range 234, processor 102 sets a portrait value to true (block 718). When the portrait value is true, the tilt (pitch and roll angles) of mobile device 100 is within the ranges of the landing position. Method 700 then continues to block 732 of FIG. 7B.

Figure 7B:
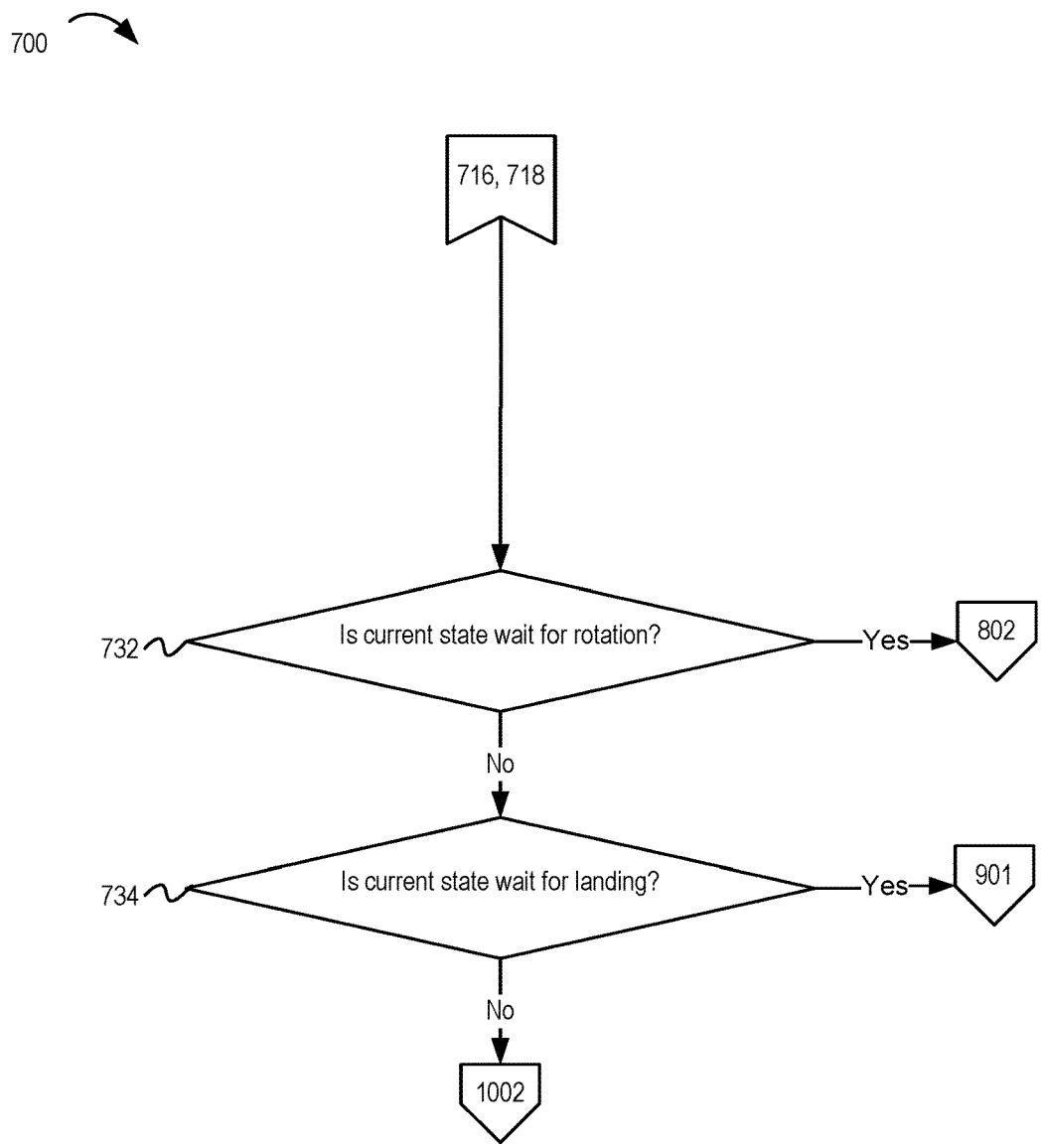

Turning to FIG. 7B, processor 102 determines if the current state 260 is the wait for rotation state (decision block 732). In response to the current state being the wait for rotation state, processor 102 continues to block 802 of FIG. 8. In response to the current state not being the wait for rotation state, processor 102 determines if the current state 260 is the wait for landing state (decision block 734). In response to the current state being the wait for landing state, processor 102 continues to block 901 of FIG. 9. In response to the current state not being the wait for landing state, the current state is determined to be the reset or rearm state, and processor 102 continues to block 1002 of FIG. 10.

Figure 8:
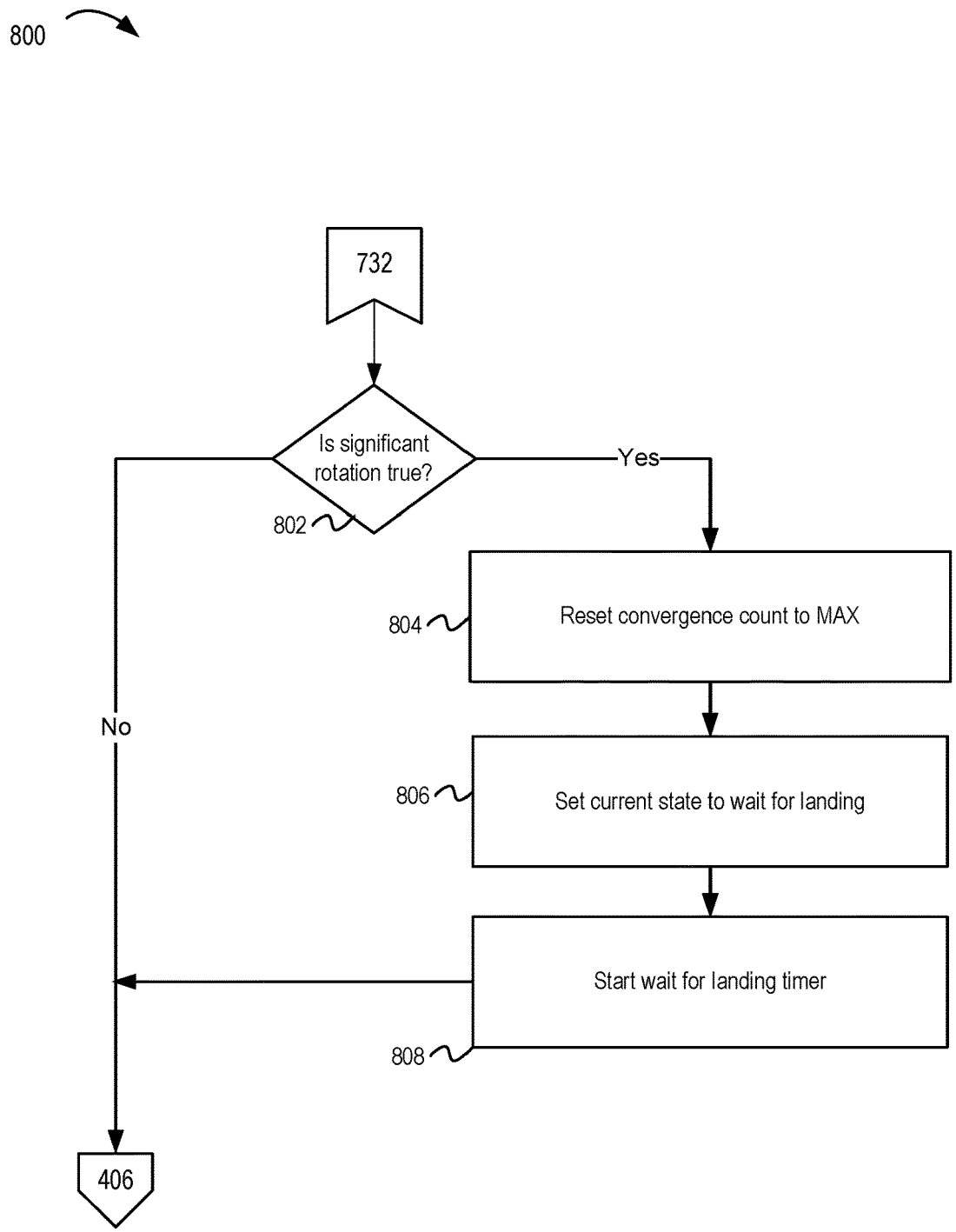
FIG. 8 depicts a method of detecting rotation of a mobile device, according to one or more embodiments.

With reference to FIG. 8, a method 800 is presented for detecting if mobile device 100 is rotating when mobile device 100 is in a wait for tilt or rotation state. After determining at decision block 732 of FIG. 7B that mobile device 100 is waiting for rotation, processor 102 determines if the significant rotation value is set to true (decision block 802). In response to the significant rotation value not being set to true, processor 102 returns to block 406 of FIG. 4 where processor 102 continues to receive accelerometer data 222. In response to the significant rotation value being set to true, processor 102 resets the convergence counter 254 to the maximum value (block 804) and sets the current state 260 to wait for landing (block 806). In one embodiment, convergence counter 254 can have a maximum value of three (3) unless the optimal portrait angle ranges 236 are available. If the optimal portrait angle ranges 236 are available, then the maximum value of convergence counter 254 is twenty. Processor 102 then starts wait for landing timer 262 at block 808. Processor 102 then returns to block 406 of FIG. 4 where processor 102 continues to receive accelerometer data 222.

Figure 9:
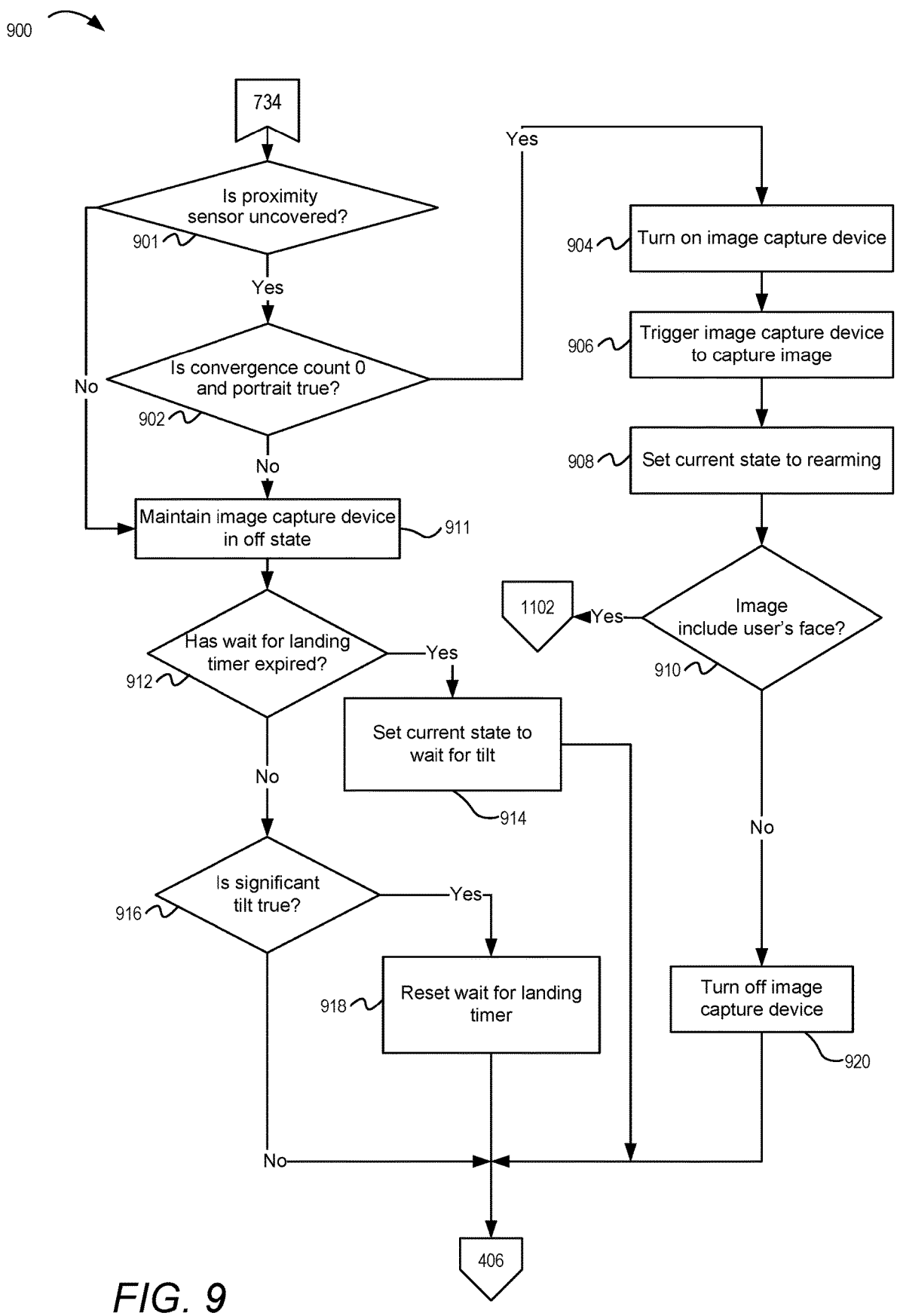
FIG. 9 depicts a method of determining if a mobile device is in a landing position, according to one or more embodiments.

FIG. 9 illustrates a method 900 for determining if mobile device 100 is in a landing position. After determining that the current state is the wait for landing state (decision block 734 of FIG. 7B), processor 102 determines if proximity sensor 160 is in an uncovered state (decision block 901). The proximity sensor is in an uncovered state when the display of mobile device 100 is not obstructed (i.e., not in a pocket or face down) as sensed by proximity sensor 160. In response to proximity sensor 160 not being in an uncovered state, processor 102 maintains image capture device 132 and display 100 in an off state (block 911). If the image capture device 132 or display 100 have been activated by a user or are currently in use, processor 102, would continue to track the orientation of mobile device 100 during movement; however, processor 102, would not turn off any functions of mobile device 100 that are currently in use.

In response to proximity sensor 160 being in an uncovered state, processor 102 determines if (i) the convergence counter 254 has a zero value and (ii) the portrait value is set to true (i.e., mobile device 100 is in the landing position) (decision block 902). The convergence counter 254 having a zero value occurs when mobile device 100 stops rotating. The portrait value is set to true when mobile device 100 has pitch and roll angles that are in a viewing orientation by a user (i.e., within portrait angle ranges 234). The accelerometer data can be used to calculate if mobile device 100 is pointing up or down (facing toward or away from ground) based on gravity acting on the accelerometer.

In response to the convergence counter 254 having a zero value, the portrait value being set to true and the proximity sensor being in an uncovered state (i.e., mobile device 100 is in the landing position), processor 102 triggers image capture device 132 to turn on (block 904) and autonomously capture image 278 (block 906) via image capture device 132. Processor 102 sets the current state 260 to rearming or resetting (block 908). At decision block 910, processor 102 determines if the captured image 278 includes a user's face. In one embodiment, processor 102 determines if the captured image 278 includes a user's face by analyzing and comparing the captured image 278 to valid face image 280.

Figure 4:
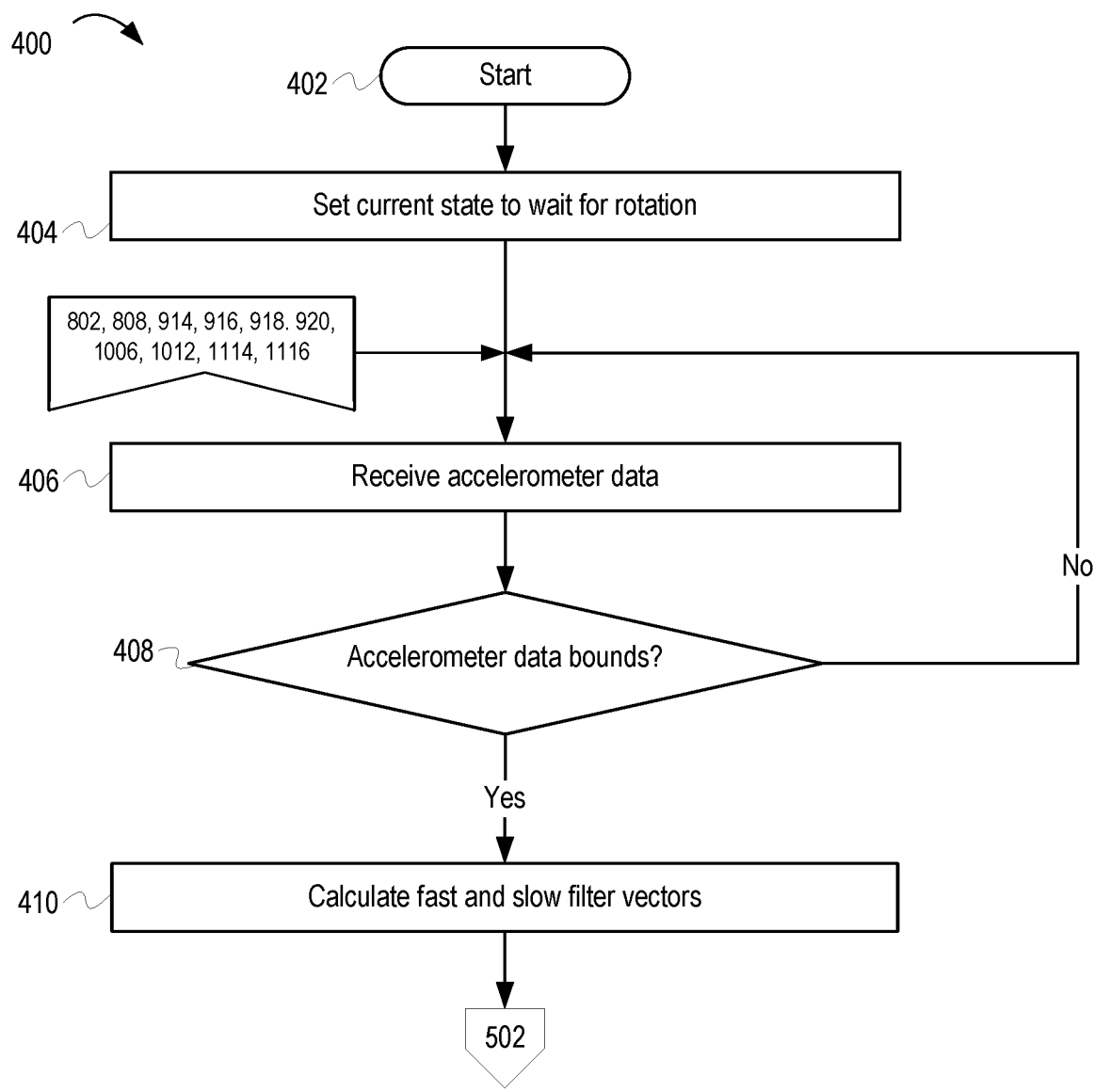
FIG. 4 depicts a method of dynamically setting a current orientation state of a mobile device, according to one or more embodiments.

In response to image 278 not including the user's face, processor 102 turns off image capture device 132 (block 920) and returns to block 406 of FIG. 4 where processor 102 continues to receive accelerometer data 222. In response to image 278 including the user's face, the method continues to block 1102 of FIG. 11. When a successful capture of the user's face is detected, the vectors or portrait angles that caused triggering of the image capture device are learned and incorporated into optimal portrait angle vector or ranges 236 as will be further described in method 1100 of FIG. 11. In one embodiment, mobile device 100 can be in a locked, non-functional state at the start of method 900. When a successful capture of the user's face is detected, mobile device 100 can be unlocked from a locked state and other features of mobile device 100, such as display 130 and buttons 107a-n, can be activated. When a successful capture of the user's face is not detected, mobile device 100 can be kept in the locked state.

Returning to decision block 902, in response to either one of the convergence counter 254 not having a zero value or the portrait value not being set to true, processor 102 maintains image capture device 132 in an off state (block 911) and determines if wait for landing timer 262 has expired (decision block 912). In one embodiment, the wait for landing timer can be set at three (3) seconds. Maintaining image capture device 132 in an off state reduces power consumption and increases battery life of mobile device 100.

In response to the wait for landing timer 262 being expired, processor 102 sets the current state 260 of mobile device 100 to wait for tilt (block 914). Processor 102 then returns to block 406 of FIG. 4 where processor 102 continues to receive accelerometer data 222. In response to the wait for landing timer 262 not being expired, processor 102 determines if the significant tilt value is true (decision block 916). In response to the significant tilt value not being true, processor 102 returns to block 406 of FIG. 4 where processor 102 continues to receive accelerometer data 222. In response to the significant tilt value being true, processor 102 resets or restarts wait for landing timer 262 (block 918). Restarting wait for landing timer 262 allows for more time for mobile device 100 to be moved to the landing position. Processor 102 then returns to block 406 of FIG. 4 where processor 102 continues to receive accelerometer data 222.

Figure 10:
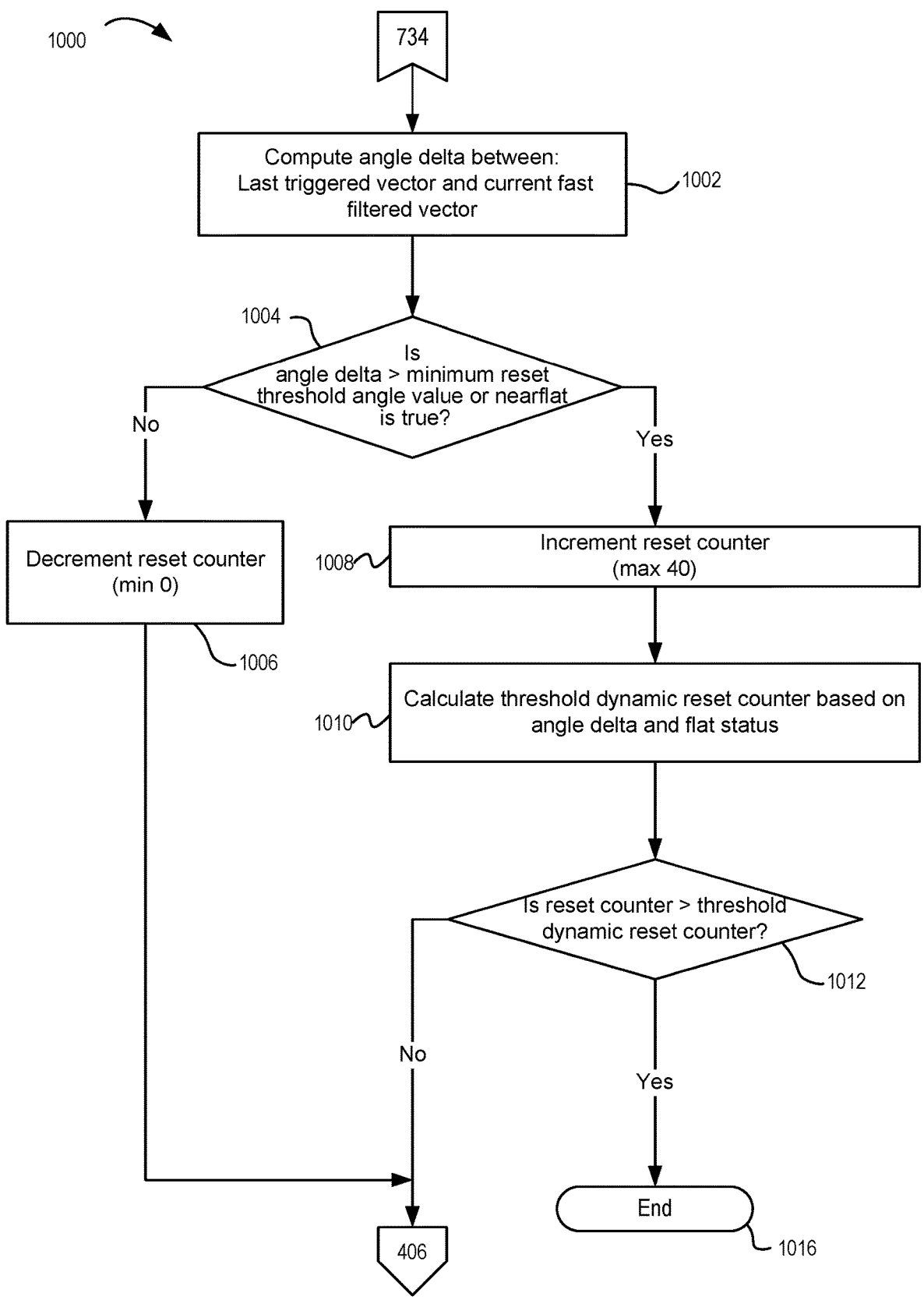
FIG. 10 depicts a method of resetting a current state of a mobile device after the mobile device has been in a landing position, according to one or more embodiments.

Referring to FIG. 10, there is shown a method 1000 for resetting a current state of mobile device 100 after the mobile device has been in a landing position. In response to the current state not being the wait for landing state of decision block 734 of FIG. 7B, processor 102 calculates the angle delta between the last triggered vector 214 and the current fast filtered vector 212 (block 1002). Processor 102 determines if the angle delta between the last triggered vector 214 and the current fast filtered vector 212 is greater than a threshold reset angle delta value or if a near flat value of the tilt (pitch and/or roll) of mobile device 100 is set to true (decision block 1004). In one embodiment, the threshold reset angle delta value can be thirty degrees. In response to determining that the angle delta between the last triggered vector 214 and the current fast filtered vector 212 is not greater than the threshold reset angle delta value or a near flat value of the tilt of mobile device 100 is not set to true, processor 102 decrements reset counter 264 (block 1006). Reset counter 264 has a minimum value of zero.

In response to determining that the angle delta between the last triggered vector 214 and the current fast filtered vector 212 is greater than the threshold reset angle delta value or if a near flat value of the tilt of mobile device 100 is set to true, processor 102 increments reset counter 264 (block 1008). In one embodiment, reset counter 264 can have a pre-determined maximum value of forty. Processor 102 calculates threshold dynamic reset counter value based on the angle delta value and near flat status (blocks 1010). A larger angular delta or flatness corresponds to a lower count threshold. A low threshold results in faster resetting to detect the next occurrence of movement of mobile device 100. In one embodiment, the threshold dynamic reset counter value can range between zero and forty.

Processor 102 determines if the value of reset counter 264 is greater than the calculated threshold dynamic reset counter value (decision block 1012). In response to reset counter 264 not being greater than the calculated threshold dynamic reset counter value, processor 102 returns to block 406 of FIG. 4 where processor 102 continues to receive accelerometer data 222. In response to reset counter 264 being greater than the calculated threshold dynamic reset counter value, method 1000 terminates at end block 1016. Method 400 can then be restarted to continue to determine the orientation of mobile device 100.

Figure 11:
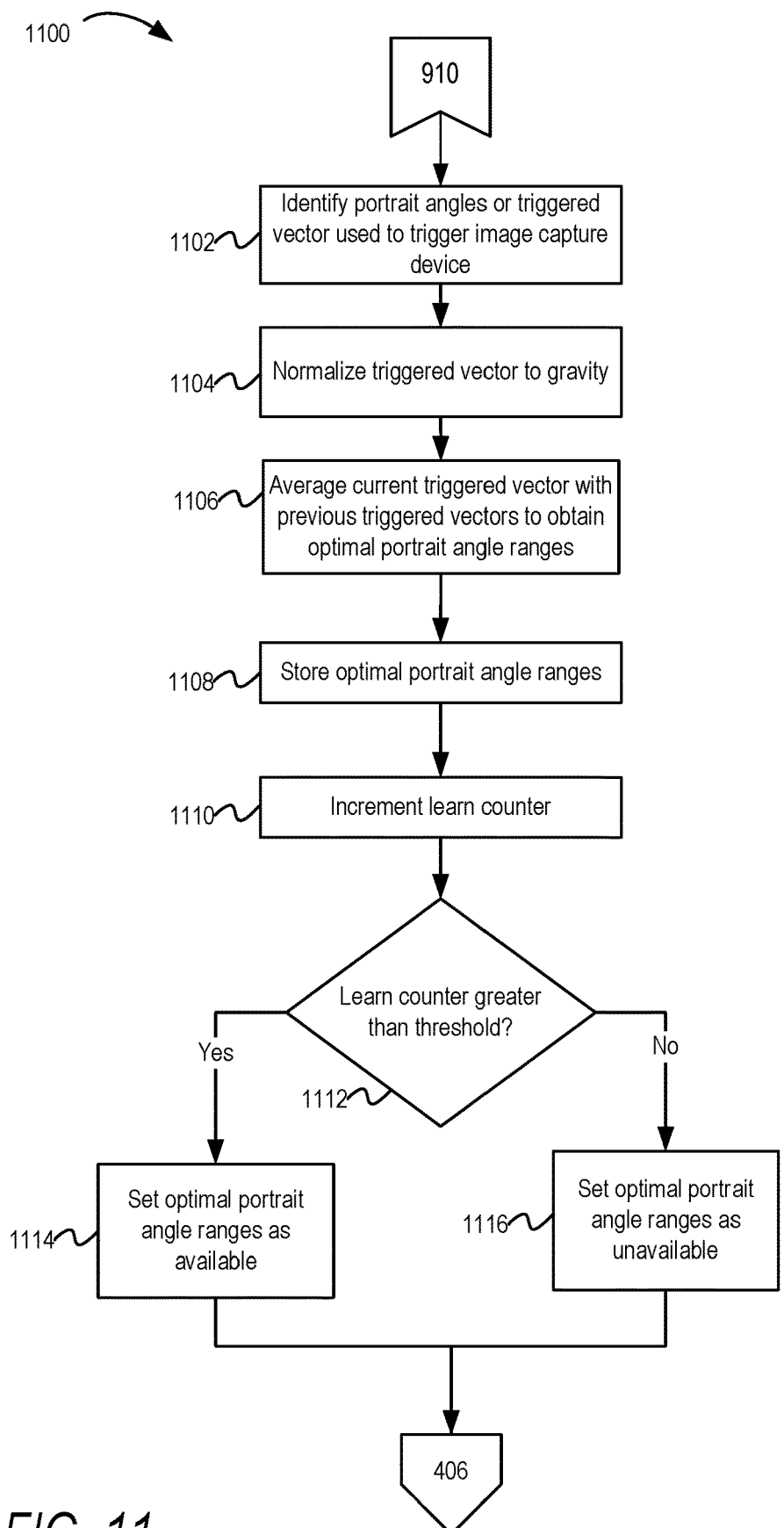
FIG. 11 depicts a method of determining optimal portrait state vectors, according to one or more embodiments.

FIG. 11 provides a method 1100 for determining optimal portrait state angle ranges or vectors. After determining that the captured image 278 matches the valid face image 280 (decision block 910 of FIG. 9), processor 102 identifies the current portrait angles or current triggered vector used to trigger image capture device 132 to turn on (block 1102). Processor 102 normalizes the current triggered vector to gravity (block 1104). Processor 102 averages the current triggered vector with previous triggered vectors to obtain optimal portrait vector or angle ranges 236 (block 1106) and stores the optimal portrait angle ranges 236 to system memory 120 (block 1108). Processor 102 increments learn counter 266 (block 1110). The current triggered vector is averaged with the previous triggered vectors to obtain optimal portrait angles ranges 236.

At decision block 1112, processor 102 determines if learn counter 266 is greater than a threshold learn count value. In one embodiment, the threshold learn count value can be ten. In response to learn counter 266 being greater than the threshold learn count value, processor 102 sets the optimal portrait angle ranges 236 as being available for use in blocks 704, 710 and 714 of FIG. 7 the next time that method 700 is executed (block 1114). Processor 102 then returns to block 406 of FIG. 4 where processor 102 continues to receive accelerometer data 222. In response to learn counter 266 not being greater than the threshold learn count value, processor 102 sets the optimal portrait angle ranges 236 as not being available for use in blocks 704, 710 and 714 of FIG. 7 (block 1116). The next time that method 700 is executed, portrait angle ranges 234 will be used in blocks 704, 710 and 714 of FIG. 7, when the optimal portrait angle ranges 236 are not available. Processor 102 then returns to block 406 of FIG. 4 where processor 102 continues to receive accelerometer data 222.

The present disclosure keeps image capture device 132 in an off state when the orientation of mobile device 100 is not in an orientation (i.e., landing position 300) to be viewed by a user. Keeping image capture device 132 in the off state results in lower battery power consumption. Image capture device 132 is turned on when the orientation of mobile device 100 is in an orientation (i.e., landing position 300) to be viewed by a user.

The present disclosure increases battery life of mobile device 100 by using only data from accelerometers 162 to calculate the orientation of mobile device 100. No gyroscope data is used. In one embodiment, accelerometers can consume less power than gyroscopes. While accelerometers 162 are providing accelerometer data to processor 102 to calculate the orientation of mobile device 100, gyroscopes 163 can be turned off, saving battery power and increasing the life of battery 143. Further, because image capture device 132 is only activated after determining that mobile device 100 is in the landing position 300, battery life of mobile device 100 is increased by minimizing false activations of image capture device 132 when mobile device 100 is not in an orientation to be viewed by a user. In addition, because image capture device 132 is only activated after determining that mobile device 100 is in the landing position 300, false activations of image capture device 132 due to incidental movement of mobile device 100 such as shaking, fidgeting, in vehicle motion, vibrations, and walking movements are minimized. Further, because image capture device 132 is only activated after determining that mobile device 100 is in the landing position 300, false activations of image capture device 132 when mobile device 100 is in an unviewable state such as in a pocket or in a bag are minimized.

In the above-described methods of FIGS. 4-11, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   detecting, via an accelerometer, movement of a mobile device;
   calculating, by a processor, an orientation of the mobile device based on accelerometer data received from the accelerometer as the mobile device is moving;
   maintaining an image capture device in an off state, while the mobile device is moving;
   receiving proximity data from the proximity sensor;
   determining if the proximity data indicates that a display of the mobile device is uncovered;
   in response to determining that the proximity data indicates that the display of the mobile device is uncovered, setting a state of the mobile device to an uncovered state;
   determining if the mobile device is in a landing position, based, at least partially, on the calculated orientation of the mobile device, wherein the mobile device is in the landing position when the mobile device is in a stopped rotating state, a portrait state, and an uncovered state; and
   in response to determining that the mobile device is not in the landing position, continuing to maintain the image capture device in the off state such that power consumption of the mobile device is reduced.

2. The method of claim 1, wherein determining if the mobile device is in the landing position further comprises:
   calculating a first rotation angle change for the mobile device based on the accelerometer data;
   retrieving a stop rotation angle change threshold;
   determining if the first rotation angle change is less than the stop rotation angle change threshold; and
   in response to determining that the first rotation angle change is less than the stop rotation angle change threshold, setting a first state of the mobile device to the stopped rotating state.

3. The method of claim 1, wherein calculating the orientation of the mobile device further comprises:
   calculating a pitch angle of the mobile device based on the accelerometer data;
   determining if the pitch angle is within a first angle range;
   in response to determining that the pitch angle is within the first angle range, calculating a roll angle of the mobile device based on the accelerometer data;
   determining if the roll angle is within a second angle range; and
   in response to determining that the roll angle is within the second angle range, setting a second state of the mobile device to the portrait state.

4. The method of claim 1, further comprising:
   calculating a second rotation angle change for the mobile device based on the accelerometer data;
   retrieving a reset rotation angle change threshold;
   determining if the second rotation angle change is greater than the reset rotation angle change threshold; and
   in response to determining that the second rotation angle change is greater than the reset rotation angle change threshold, resetting a current state of the mobile device to a waiting for rotation state.

5. The method of claim 1, further comprising:
   in response to determining that the mobile device is in the landing position, triggering the image capture device to turn on and autonomously capturing an image via the image capture device;
   determining if the captured image includes a user's face in the captured image; and
   in response to determining that the captured image includes a user's face in the captured image, identifying pitch and roll angles associated with the captured image that includes the user's face.

6. The method of claim 5, further comprising:
   generating an optimal portrait state vector based at least partially on the pitch and roll angles associated with the captured image that includes the user's face; and
   saving the optimal portrait state vector to a memory.

7. A mobile device comprising:
   a memory having stored thereon an orientation program code for determining an orientation of the mobile device;
   an accelerometer that detects movement of the mobile device; and
   one or more processors communicatively coupled to the memory and to the accelerometer, the processor executing the orientation program code which enables the mobile device to:
   receive accelerometer data from the accelerometer as the mobile device is moving;
   calculate, by the processor, an orientation of the mobile device based on the accelerometer data;
   maintain an image capture device in an off state, while the mobile device is moving;
   receive proximity data from the proximity sensor;
   determine if the proximity data indicates that a display of the mobile device is uncovered; and
   in response to determining that the proximity data indicates that the display of the mobile device is uncovered, setting a state of the mobile device to an uncovered state;

determine if the mobile device is in a landing position based at least partially on the calculated orientation of the mobile device, wherein in the landing position, the mobile device is in a stopped rotating state, in a portrait state, and in the uncovered state; and in response to determining that the mobile device is not in the landing position, continuing to maintain the image capture device in the off state such that power consumption of the mobile device is reduced.

8. The mobile device of claim 7, wherein determining if the mobile device is in the landing position comprises the processor further enabled to:

calculate a first rotation angle change for the mobile device based on the accelerometer data;

retrieve a stop rotation angle change threshold;

determine if the first rotation angle change is less than the stop rotation angle change threshold; and in response to determining that the first rotation angle change is less than the stop rotation angle change threshold, setting a first state of the mobile device to the stopped rotating state.

9. The mobile device of claim 7, wherein calculating the orientation of the mobile device comprises the processor further enabled to:

calculate a pitch angle of the mobile device based on the accelerometer data;

determine if the pitch angle is within a first angle range;

in response to determining that the pitch angle is within the first angle range, calculate a roll angle of the mobile device based on the accelerometer data;

determine if the roll angle is within a second angle range; and in response to determining that the roll angle is within the second angle range, setting a second state of the mobile device to the portrait state.

10. The mobile device of claim 7, wherein the processor is further enabled to:

calculate a second rotation angle change for the mobile device based on the accelerometer data;

retrieve a reset rotation angle change threshold;

determine if the second rotation angle change is greater than the reset rotation angle change threshold; and in response to determining that the second rotation angle change is greater than the reset rotation angle change threshold, resetting a current state of the mobile device to a waiting for rotation state.

11. The mobile device of claim 7, wherein the processor is further enabled to:

in response to determining that the mobile device is in the landing position, trigger the image capture device to turn on and autonomously capture an image via the image capture device;

determine if the captured image includes a user's face in the captured image; and in response to determining that the captured image includes a user's face in the captured image, identify pitch and roll angles associated with the captured image that includes the user's face.

12. The mobile device of claim 11, wherein the processor is further enabled to:

generate an optimal portrait state vector based at least partially on the pitch and roll angles associated with the captured image that includes the user's face; and save the optimal portrait state vector to the memory.

13. A computer program product comprising:

a non-transitory computer readable storage device with program code stored thereon which, when executed by one or more processors of a mobile device having an accelerometer and a memory, enables the mobile device to complete the functionality of:

receiving accelerometer data from the accelerometer as the mobile device is moving;

calculating an orientation of the mobile device based on the accelerometer data;

maintaining an image capture device in an off state, while the mobile device is moving;

receive proximity data from a proximity sensor;

determine if the proximity data indicates that a display of the mobile device is uncovered;

in response to determining that the proximity data indicates that the display of the mobile device is uncovered, set a state of the mobile device to an uncovered state;

determining if the mobile device is in a landing position based at least partially on the calculated orientation of the mobile device, wherein in the landing position, the mobile device is in a stopped rotating state, and in a portrait state, and in the uncovered state; and in response to determining that the mobile device is in the landing position, continuing to maintain the image capture device in the off state such that power consumption of the mobile device is reduced.

14. The computer program product of claim 13, wherein the program code for determining if the mobile device is in the landing position comprises program code that further enables the mobile device to complete the functionality of:

calculating a first rotation angle change for the mobile device based on the accelerometer data;

retrieving a threshold stop rotation angle change;

determining if the first rotation angle change is less than the threshold stop rotation angle change; and in response to determining that the first rotation angle change is less than the threshold stop rotation angle change, setting a first state of the mobile device to the stopped rotation state.

15. The computer program product of claim 13, wherein the program code for calculating the orientation of the mobile device comprises program code that further enables the mobile device to complete the functionality of:

calculating a pitch angle of the mobile device based on the accelerometer data;

determining if the pitch angle is within a first angle range;

in response to determining that the pitch angle is within the first angle range, calculating a roll angle of the mobile device based on the accelerometer data;

determining if the roll angle is within a second angle range; and in response to determining that the roll angle is within the second angle range, setting a second state of the mobile device to the portrait state.

16. The computer program product of claim 13, wherein the program code further enables the mobile device to complete the functionality of:

calculating a second rotation angle change for the mobile device based on the accelerometer data;

retrieving a threshold reset rotation angle change;

determining if the second rotation angle change is greater than the threshold reset rotation angle change; and in response to determining that the second rotation angle change is greater than the threshold reset rotation angle change, resetting a current state of the mobile device to a waiting for rotation state.

17. The computer program product of claim 13, wherein the program code further enables the mobile device to complete the functionality of:
- in response to determining that the mobile device is in the landing position, triggering the image capture device to turn on and autonomously capturing an image via the image capture device;
- determining if the captured image includes a user's face in the captured image;
- in response to determining that the captured image includes a user's face in the captured image, identifying pitch and roll angles associated with the captured image that includes the user's face;
- generating an optimal portrait state vector based at least partially on the pitch and roll angles associated with the captured image that includes the user's face; and
- saving the optimal portrait state vector to a memory.

* * * * *